(12) United States Patent
Zartman et al.

(10) Patent No.: US 10,323,139 B2
(45) Date of Patent: Jun. 18, 2019

(54) MASTERBATCH PREPARATION OF SILICA RICH RUBBER COMPOSITION, RUBBER COMPOSITION AND TIRE WITH COMPONENT

(71) Applicant: The Goodyear Tire & Rubber Company, Akron, OH (US)

(72) Inventors: Gregory Daniel Zartman, Akron, OH (US); Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 82 days.

(21) Appl. No.: 15/401,440

(22) Filed: Jan. 9, 2017

(65) Prior Publication Data

US 2018/0194933 A1 Jul. 12, 2018

(51) Int. Cl.
*C08J 3/22* (2006.01)
*C08L 9/06* (2006.01)
*B60C 1/00* (2006.01)
*C08K 3/36* (2006.01)
*C08L 9/00* (2006.01)
*C08C 19/20* (2006.01)

(52) U.S. Cl.
CPC ............... *C08L 9/06* (2013.01); *B60C 1/00* (2013.01); *B60C 1/0016* (2013.01); *C08C 19/20* (2013.01); *C08J 3/22* (2013.01); *C08J 3/226* (2013.01); *C08K 3/36* (2013.01); *C08L 9/00* (2013.01); *C08J 2309/06* (2013.01); *C08J 2409/00* (2013.01); *C08L 2205/02* (2013.01); *C08L 2205/03* (2013.01); *C08L 2310/00* (2013.01)

(58) Field of Classification Search
CPC ..... C08F 8/34; C08J 3/22; C08J 3/226; C08K 3/36; C08K 9/04; C08K 9/06; C08K 9/10; C08L 9/00; C08L 9/06; C08L 2205/02; C08L 2205/03
See application file for complete search history.

(56) References Cited

U.S. PATENT DOCUMENTS

| | | | |
|---|---|---|---|
| 5,064,901 A | 11/1991 | Machado | 525/92 |
| 5,696,197 A | 12/1997 | Smith et al. | 524/495 |
| 5,773,504 A | 6/1998 | Smith et al. | 524/492 |
| 9,260,594 B2 | 2/2016 | Fuchs et al. | 524/492 |
| 2006/0106149 A1 | 5/2006 | Sandstrom et al. | |
| 2008/0027162 A1 | 1/2008 | Hua et al. | |
| 2011/0082242 A1 | 4/2011 | Sandstrom | |
| 2016/0264768 A1 | 9/2016 | Francik et al. | |
| 2018/0194167 A1* | 7/2018 | Mihara | C08L 91/00 |

OTHER PUBLICATIONS

EPO search report completed Apr. 9, 2018 and dated May 3, 2018.

* cited by examiner

*Primary Examiner* — Edward J Cain
(74) *Attorney, Agent, or Firm* — John D. DeLong; Henry C. Young

(57) ABSTRACT

The invention relates to masterbatch preparation of a silica rich rubber composition, rubber compositions thereof and tire with component.

22 Claims, 1 Drawing Sheet

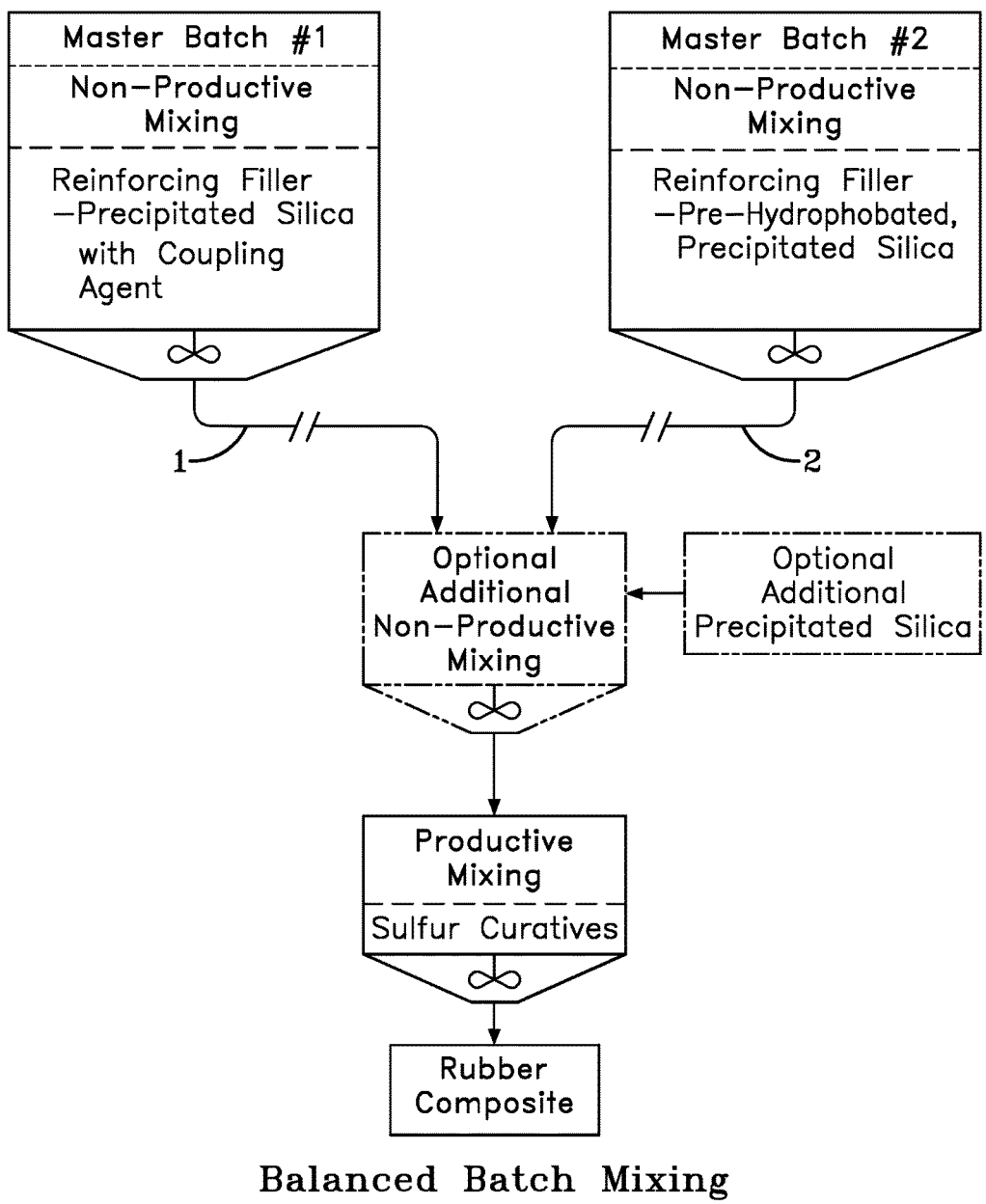
Balanced Batch Mixing

(12) United States Patent
US 10,323,139 B2

MASTERBATCH PREPARATION OF SILICA RICH RUBBER COMPOSITION, RUBBER COMPOSITION AND TIRE WITH COMPONENT

FIELD OF THE INVENTION

The invention relates to masterbatch preparation of a silica rich rubber composition, rubber compositions thereof and tire with component.

BACKGROUND OF THE INVENTION

Tires are typically prepared with treads comprised of diene-based rubber compositions which may contain particulate synthetic amorphous precipitated silica reinforcement, usually referred to as precipitated silica, together with a silica coupling agent having a moiety reactive with hydroxyl groups (e.g. silanol groups) contained on the surface of the silica and another, different, moiety interactive with diene-based elastomers contained in the rubber composition.

A precipitated silica reinforced rubber composition may be provided, for example, by the addition of a precipitated silica to a rubber composition containing a diene based elastomer together with a silica coupling agent to chemically react with the precipitated silica in situ within the rubber composition to couple the precipitated silica to the diene based elastomer of the rubber composition.

Alternatively, a precipitated silica reinforced rubber composition may be provided, for example, by the addition of a pre-hydrophobated precipitated silica, comprised of a precipitated silica pre-treated with a silica coupling agent, to a rubber composition containing a diene based elastomer to couple the precipitated silica to the diene based elastomer of the rubber composition.

Reinforcing fillers for diene elastomer based rubber compositions, such as for example precipitated silica and rubber reinforcing carbon black, tend to assume a preferential affinity for, and therefore a preferential reinforcement of, diene based elastomer(s) with which they are first blended. Therefore, it is considered that the order of addition of individual elastomers and precipitated silica to prepare a rubber composition can vary the effective reinforcement of the rubber composition which can, in turn, lead to rubber compositions with a variety of physical properties.

The methodology of this invention is considered to be a significant a departure from and exclusive of simply blending elastomer(s) and combination of precipitated silica (with a silica coupler) and pre-hydrophobated precipitated silica or sequentially blending a combination of precipitated silica (with its silica coupler) and pre-hydrophobated precipitated silica with elastomers.

This methodology is intended to be differentiated as a departure from a sequential order of mixing two precipitated silicas with a rubber composition where a first pre-treated (pre-hydrophobated) precipitated silica is first blended with a rubber composition followed by the addition of a second, non-pre-treated (non-pre-hydrophobated) precipitated silica, or vice-versa, or both of the precipitated silicas blended together with the elastomer in a rubber mixer (e.g. an internal rubber mixer such as, for example, a Banbury™ mixer). In such order of mixing, the first blended precipitated silica (e.g. as a pre-hydrophobated precipitated silica or the non-pre-hydrophobated precipitated silica) is considered to be primarily associated with the rubber composition to provide an attendant primary reinforcement contribution of the rubber composition as compared to the second blended precipitated silica. It is envisioned that various physical properties of the resultant rubber composition would therefore depend upon the order of sequential addition of the precipitated silicas.

For example, it is readily seen that, for such sequential mixing, a precipitated silica which has been pre-treated with a silica coupling agent may be reacted with diene based elastomer(s) which has already been reacted with a combination of precipitated silica and silica coupling agent, or vice versa.

Contrary to such sequential mixing, it is desired to evaluate the separate and individual mixing of pre-treated (pre-hydrophobated) precipitated silica with diene based elastomer(s) and the separate and individual mixing of precipitated silica and coupling agent with diene based elastomer(s) as individual and separate masterbatches thereof followed by blending such masterbatches together with sulfur vulcanization ingredients. In such manner it is envisioned that each of the pre-treated (pre-hydrophobated) precipitated silica and precipitated silica with its silica coupling agent can achieve individually separate affiliations with, and thereby separate reinforcements of, diene based elastomers for the ultimately mixed rubber composition masterbatches without significant interference from each other which may be expected from the aforesaid sequential mixing of the precipitated silica (together with silica coupling agent) and pre-treated (with silica coupling agent) with the rubber composition.

Therefore, the term "masterbatch" or "master batch" as used herein relates to blending the ingredients of the uncured rubber composition in what is usually referred to as "non-productive mixing". For this invention, separately prepared masterbatches are blended together to form a blended rubber composition either together with sulfur curatives or prior to subsequent and separate mixing of sulfur curatives (e.g. sulfur and at least one sulfur vulcanization accelerator) with the blended rubber composition.

It is believed that such masterbatch mixing methodology for the aforesaid combined precipitated silica reinforcement of rubber compositions containing diene based elastomers is a significant departure from past practice.

In the description of the invention, the term "silica-rich" refers to a rubber composition in which, insofar as rubber reinforcing carbon black and precipitated silica reinforcing fillers are concerned, the reinforcing filler for the rubber composition is primarily precipitated silica.

The term "phr" where used herein, and according to conventional practice, refers to "parts of a respective material per 100 parts by weight of rubber, or elastomer".

The terms "rubber" and "elastomer" where used herein, are to be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art. The terms "vulcanize" and "cure" where used therein are used interchangeably unless otherwise indicated.

SUMMARY AND PRACTICE OF THE INVENTION

In accordance with this invention, a method is provided for preparation of a sulfur curable rubber composition comprised of at least two diene-based rubbers with precipitated silicas comprised of (1) a precipitated silica pre-treated with a silica coupling agent (a pre-hydrophobated precipitated silica) and (2) a precipitated silica together with a silica coupling agent, wherein said method is comprised of, based on parts by weight per 100 parts by weight rubber (phr):

(A) preparation of a first masterbatch comprised of:
 (1) at least two conjugated diene-based elastomers,
 (2) about 40 to about 200, alternately from about 50 to about 150, phr of reinforcing filler comprised of rubber reinforcing carbon black and precipitated silica together with silica coupling agent for said precipitated silica having a moiety reactive with hydroxyl groups on said precipitated silica and another different moiety interactive with said diene-based elastomers, where the weight ratio of said precipitated silica to carbon black is desirably at least about 8/1 and more desirably at least about 10/1, (B) preparation of a second masterbatch comprised of:
 (1) at least two conjugated diene-based elastomers,
 (2) about 40 to about 200, alternately about 50 to about 150, phr of reinforcing filler comprised of rubber reinforcing carbon black and precipitated silica pre-treated with a silica coupling agent (pre-hydrophobated precipitated silica), where the weight ratio of said pre-treated precipitated silica to carbon black is desirably at least about 8/1 and more desirably at least about 10/1, (C) blending said first and second masterbatches together to form a blended rubber composition,
 (1) together with sulfur curatives comprised of sulfur and at least one sulfur vulcanization accelerator, or
 (2) thereafter blending sulfur curatives with said blended rubber composition where the sulfur curatives are comprised of sulfur and at least one sulfur vulcanization accelerator, wherein said silica coupling agents for said precipitated silica and said pre-treated (pre-hydrophobated) precipitated silica are comprised of at least one of alkoxyorganomercaptosilane and bis(3-triethoxysilylpropyl) polysulfide containing an average of from 2 to about 4, alternately from about 2 to about 2.6 or from 3.5 to about 4, connecting sulfur atoms in its polysulfidic bridge.

In further accordance with this invention, a rubber composition is provided comprised of said blend of said masterbatches as a product of:

(A) a first composite of rubber composition of said first masterbatch comprised of said at least two conjugated diene-based rubbers coupled to said precipitated silica with said silica coupler (coupling agent), (e.g. coupled in situ within said rubber composition), where said silica coupler has a moiety reactive with hydroxyl groups on said precipitated silica and another different moiety interactive with said diene-based elastomer(s), and (B) a second composite of rubber composition of said second masterbatch comprised of said at least two conjugated diene-based rubbers coupled to said pre-hydrophobated precipitated silica comprised of precipitated silica pre-treated with silica coupler (coupling agent), where said silica coupler has a moiety reactive with hydroxyl groups on said precipitated silica and another different moiety interactive with said diene-based elastomer(s), wherein said rubber composition is comprised of said pre-treated (pre-hydrophobated) precipitated silica and said precipitated silica in a weight ratio thereof in a range of from about 4/1 to about 1/4.

In further accordance with this invention a rubber composition is provided of said blend of masterbatches blended with sulfur curatives comprised of sulfur and at least one sulfur vulcanization accelerator.

In further accordance with this invention, a rubber composition is provided with an additional precipitated silica blended with said blend of masterbatches.

In one embodiment, said conjugated diene based elastomers are comprised of styrene/butadiene rubber and cis 1,4-polybutadiene rubber.

In one embodiment, said silica coupling agent for said precipitated silica of said first masterbatch is comprised of said bis(3-triethoxysilylpropyl) polysulfide.

In one embodiment, said silica coupling agent for said pre-treated precipitated silica of said second masterbatch is an alkoxyorganomercaptosilane.

In one embodiment, the weight ratio of said styrene/butadiene rubber to said cis 1,4-polybutadiene rubber in said first masterbatch is in a range of from about 10/1 to about 1/10 and in said second masterbatch is in a range of from about 10/1 to about 1/10, wherein the weight ratio of said styrene/butadiene rubber to said cis 1,4-polybutadiene rubber in said masterbatch blend is in a range of from about 10/1 to about 5/1.

In one embodiment, at least one of said first and second masterbatches further contains from about 5 to about 20 phr of at least one additional conjugated diene based elastomer selected from polymers of at least one of isoprene and 1,3-butadiene and styrene with at least one of isoprene and 1,3-butadiene.

In one embodiment, said additional diene based elastomer is cis 1,4-polyisoprene rubber (natural and/or synthetic rubber, desirably natural rubber).

In one embodiment, each of said first and second masterbatches is individually mixed to a temperature in a range of from about 140° C. to about 170° C.

In one embodiment, said first and second masterbatches are mixed together to form a blended rubber composition following which sulfur and vulcanization accelerators are subsequently added to the blended rubber composition in a separate mixing step.

In one embodiment, the blend of first and second masterbatches are mixed together with sulfur and at least one sulfur vulcanization accelerator to a temperature in a range of from about 100° C. to about 130° C., alternately within a range of from about 100° C. to about 120° C.

In one embodiment said first and second masterbatches are mixed together to form a blended rubber composition to which additional precipitated silica (non-pre-treated precipitated silica) is blended with said blended masterbatches following which said sulfur and sulfur vulcanization accelerator(s) are subsequently blended therewith in a separate mixing step. For such added precipitated silica, it is desired that additional silica coupling agent is not added so that the added precipitated silica is reacted with residual silica coupling agent which may be contained in the mixed masterbatches. Therefore, by such method, it is intended that said added precipitated silica is reacted with residual coupling agent (e.g. residual unreacted coupling agent) contained in the rubber composition without addition of coupling agent to the blended masterbatches.

A significant aspect of this invention is isolating the preliminary mixing of precipitated silica, together with silica coupling agent, with diene-based elastomers in a first masterbatch and preliminary mixing of a pre-hydrophobated precipitated silica with diene-based elastomers of the second masterbatch.

In this manner, then, a significant aspect of the invention is providing the preliminary reaction of the reaction of coupling agent with hydroxyl groups of the precipitated silica and said diene-based elastomers to form a product thereof in said first masterbatch as being isolated from the preliminary reaction of the pre-treated precipitated silica with its diene based elastomers to form a product thereof in said second masterbatch.

A further aspect of the invention is the blending of the masterbatches to allow the coupling agent, which had been provided in the first masterbatch, to further react with the remaining hydroxyl groups of said precipitated silica of said pre-hydrophobated silica (which had been provided in said second masterbatch) to promote formation of a complex product network containing said product of said first masterbatch and said product of said second masterbatch.

While the mechanism may not be completely understood, it is envisioned that the pre-treated precipitated silica remains preferentially and primarily associated with the diene based elastomers of the second masterbatch and the precipitated silica (non-pre-treated precipitated silica) remains preferentially primarily associated with the diene based elastomers of the first masterbatch after the two masterbatches are mixed together to thereby collectively provide individual silica reinforcements in the resultant rubber composition.

In this manner, a benefit is gained by achievement of physical properties for a rubber composition resulting from a combination of individual physical properties of the first and second masterbatches prepared separately followed by being blended together.

In further accordance with this invention, a rubber composition is provided which is comprised of said composite product of blended masterbatches.

In one aspect of the invention, a rubber composition is provided as being prepared by the method of this invention.

In additional accordance with this invention, a tire is provided having at least one component comprised of said composite product of said rubber composition.

In additional accordance with this invention, said tire component is a tire tread.

In one embodiment, the styrene/butadiene elastomer is said functionalized styrene/butadiene elastomer for at least one of said masterbatches, and alternately, for both of said masterbatches.

In one embodiment, at least one of said styrene/butadiene rubber and functionalized styrene/butadiene rubber is silicon or tin coupled to thereby significantly increase its molecular weight. In such manner, the styrene/butadiene rubber is provided as a branched elastomer.

Examples of tin coupled, styrene/butadiene copolymer elastomers might be found, for example, and not intended to be limiting, in U.S. Pat. No. 5,064,901.

For the reinforcing materials, in addition to the hereinbefore referenced reinforcing fillers comprised of rubber reinforcing carbon black and precipitated silica, the rubber compositions may contain minor amounts of reinforcement materials such as, for example, short fibers of organic polymers, particularly aramid fibers, and exfoliated clay particles such as, for example, exfoliated Montmorillonite clay particles.

The rubber composition itself can also be provided as being a sulfur cured composition through vulcanization of the uncured rubber composition as a tire component (e.g. tire tread) in a manner well known to those having skill in such art, usually by curing under conditions of elevated temperature and pressure in a suitable mold for a suitable period of time.

The curatives for sulfur curing the rubber composition are curatives conventionally used for sulfur curable elastomers which typically include an addition of free sulfur and one or more appropriate cure accelerators and sometimes also a cure retarder. Such curatives and use thereof for sulfur curable elastomer compositions are well known to those skilled in the art.

It is to be appreciated that the coupling agent, if in a liquid form, might be used in conjunction with a carbon black carrier, namely, pre-mixed with a carbon black, particularly a rubber reinforcing carbon black, prior to the addition to the rubber composition, and such rubber reinforcing carbon black can be included in the amount of rubber reinforcing carbon black accounted for in the rubber composition formulation.

It is readily understood by those having skill in the art that the rubber composition would be compounded, as may be appropriate, by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, the aforesaid precipitated silicas, and plasticizers, fillers, pigments, fatty acid, zinc oxide, waxes, antioxidants and antiozonants, peptizing agents and reinforcing materials. Depending on the intended use of the sulfur vulcanizable and sulfur vulcanized material (rubbers), the additives mentioned above are selected and commonly used in conventional amounts.

In the preparation of the rubber composition typical amounts of tackifier resins, if used, may comprise, for example, about 0.5 to about 10 phr, usually about 1 to about 5 phr. Typical amounts of processing aids may comprise, for example, about 1 to about 50 phr. Such processing aids can include, for example, aromatic, naphthenic, and/or paraffinic processing oils. Typical amounts of antioxidants may comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants, if used, may comprise, for example, about 1 to about 5 phr. Typical amounts of fatty acids, where used, which can include stearic acid, palmitic acid, linoleic acid or mixtures of one or more fatty acids, can comprise, for example from about 0.5 to about 5 phr. Typical amounts of zinc oxide may comprise, for example, about 1 to about 5 phr. Typical amounts of waxes, usually microcrystalline waxes, if used, may comprise, for example, about 1 to about 5 phr. Typical amounts of peptizers, if used, may comprise, for example, from about 0.1 to about 1 phr. Typical peptizers may be comprised of, for example, pentachlorothiophenol and dibenzamidodiphenyl disulfide.

As indicated, the vulcanization is conducted in the presence of a sulfur vulcanizing agent. Examples of suitable sulfur vulcanizing agents include the elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used, for example, in an amount ranging from about 0.5 to about 4 phr, or even, in some circumstances, up to about 8 phr, with a range of from about 1 to about 2.5, sometimes from about 1 to about 2, being preferred.

Accelerators are used to control the time and/or temperature required for vulcanization and to improve the properties of the vulcanizate. In one embodiment, a single accelerator system may be used, i.e. primary accelerator. Conventionally and preferably, a primary accelerator(s) is used, for example, in total amounts ranging from about 0.5 to about 4, preferably about 0.8 to about 2, phr. In another embodiment, combinations of a primary and a secondary accelerator might be used with the secondary accelerator being used in amounts of, for example, about 0.05 to about 3 phr in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used, if desired and appropriate. Various accelerators that may be used are, for example, various amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is generally a guanidine, dithiocarbamate or thiuram compound.

The presence and relative amounts of the above ingredients, other than aforesaid precipitated silicas and associated coupling agents are not considered to be a primary subject of this invention.

As hereinbefore discussed, the rubber composition prepared according to the method of this invention may be used, for example, as tire components such as tire treads. Such tires can be built, shaped, molded and cured by various methods which are known and will be readily apparent to those having skill in such art.

BRIEF DESCRIPTION OF DRAWINGS

FIG. 1 (FIG. 1) is provided to show preparation of a rubber composition by a process of dual masterbatch preparation of separate rubber compositions and blending of the masterbatches to form a blended rubber composition (non-productive mixing) followed by a separate and final mixing step for addition of sulfur curatives to the blended rubber composition (productive mixing).

THE DRAWINGS

In FIG. 1, Master Batch No. 1 relates to non-productive mixing of diene-based elastomer(s) with reinforcing filler which is based upon precipitated silica and silica coupling agent for the precipitated silica. The diene-based elastomers are not specifically referred to in the drawing.

In FIG. 1, master batch No. 2 relates to non-productive mixing of diene-based elastomer(s) with reinforcing filler which is based upon pre-hydrophobated precipitated silica. The pre-hydrophobated precipitated silica is a precipitated silica pre-reacted with a silica coupling agent. The diene-based elastomers are not specifically referred to in the drawing.

In this manner, in master batch No. 1 the precipitated silica and silica coupling agent are allowed to react in situ within the rubber composition with each other and with diene-based elastomers of the rubber composition to from a precipitated silica reinforced rubber network.

In this manner in master batch No. 2, the pre-hydrophobated precipitated silica is allowed to react in situ within the rubber composition with diene-based elastomers of the rubber composition to from a precipitated silica reinforced rubber network.

It is a significant feature of process that the initial reaction of the silica coupling agent in master batch No. 1 with the precipitated silica and diene-based elastomers is kept separate from the reaction of the pre-hydrophobated silica with the diene-based elastomers in master batch No. 2.

In FIG. 1, it is further shown that an additional, optional, non-productive mixing of the masterbatch blend is provided.

In FIG. 1, it is further shown that an optional addition of precipitated silica (without an accompanying silica coupling agent) to the masterbatch blend is provided.

In FIG. 1, a separate and final mixing step is shown in which sulfur curatives are added to the rubber composition comprised of the masterbatch blend.

The following examples are provided to further illustrate the invention. The parts and percentages are by weight unless otherwise indicated.

EXAMPLE I

Control A and Control B rubber Samples were prepared as separate individual masterbatches of rubber compositions. The masterbatches of Control rubber Sample A and Control rubber Sample B were not blended together. Thereafter, in a subsequent and separate mixing step sulfur curatives (sulfur and accelerators) were blended with each of the masterbatches.

The masterbatch of Control rubber Sample A contained precipitated silica, together with silica coupler and a minor amount of rubber reinforcing carbon black as filler reinforcement for the rubber composition.

The masterbatch of Control rubber Sample B contained pre-hydrophobated precipitated silica (precipitated silica pre-treated with silica coupler) and a minor amount of rubber reinforcing carbon black as filler reinforcement for the rubber composition.

The masterbatch of Control rubber Sample A was a silica-rich rubber sample comprised of a blend of elastomers (styrene/butadiene and cis 1,4-polybutadiene elastomers) together with reinforcing fillers comprised of a minor amount of rubber reinforcing carbon black and a major amount of precipitated silica, together with coupling agent for the precipitated silica. The precipitated silica was coupled in situ (coupled within the rubber composition) to the diene-based elastomer by the coupling agent. In a subsequent and separate mixing step, sulfur curatives (sulfur and accelerator) where added following which the rubber composition was sulfur cured at an elevated temperature and pressure.

The masterbatch of Control rubber Sample B, was a silica-rich rubber sample similar to Control rubber Sample A except that, and contrary to Control rubber sample A, the precipitated silica was a pre-treated (pre-hydrophobated) precipitated silica comprised of precipitated silica pre-treated (pre-hydrophobated) with a silica coupling agent to form a composite thereof and the composite added to the rubber composition. In a subsequent and separate mixing step, sulfur curatives (sulfur and accelerator) were added following which the rubber composition was sulfur cured at an elevated temperature and pressure.

The general formula for masterbatches for Control rubber Samples A and B, together with subsequently added sulfur curatives, are illustrated in the following Table 1.

TABLE 1

| Materials | Parts by Weight |
|---|---|
| Non-productive Mixing Step(s) | |
| Styrene/butadiene rubber[1] | 85 |
| Cis 1,4-polybutadiene rubber[2] | 15 |
| Rubber reinforcing carbon black[3] | 5 |
| Rubber processing oil | 21 |
| Fatty acids[4] | 5 |
| Wax | 1.5 |
| Zinc oxide | 1 |
| Resin[5] | 7.5 |
| Antioxidants | 3 |
| Processing aid | 2 |
| Precipitated silica[6] | 85 and 0 |
| Silica coupler[7] | 7 and 0 |
| Pre-hydrophobated silica[8] | 0 and 85 |
| Productive Mixing Step | |
| Sulfur | 1.6 |
| Sulfur cure accelerators(s)[9] | 4.5 |

[1]Styrene/butadiene rubber as Sprintan 4602 ™ from Trinseo as a styrene/butadiene rubber having a Tg of about −26° C. and containing end functional groups (for example comprised of siloxy and thiol groups) reactive with hydroxyl groups on precipitated silica
[2]Cis 1,4-polybutadiene rubber having a Tg (glass transition temperature) of about −102° C. as BUD 4001 ™ from The Goodyear Tire & Rubber Company
[3]Rubber reinforcing carbon black as N550, an ASTM designation
[4]Fatty acids comprised of stearic, oleic and palmitic acids
[5]Styrene/alphamethylstyrene resin having a softening point of about 85° C., ASTM D28, as Resin 2336 ™ from Eastman Chemical
[6]Precipitated silica as Zeosil 1156MP ™ from Solvay
[7]Silica coupler as Si266 ™ from Evonik comprised of a bis(3-triethoxysilylpropyl) polysulfide having an average of from about 2 to about 2.6 connecting sulfur atoms in its polysulfidic bridge.
[8]Pre-hydrophobated precipitated silica as precipitated silica pre-treated with an alkoxyorganomercaptosilane as Agilon ™ 400 from PPG Industries
[9]sulfur cure accelerators comprised of a combination of sulfenamide and diphenylguanidine.

Various cured and uncured rubber properties for Control rubber Sample A and Control rubber Sample B are reported in the following Table 2.

TABLE 2

| | Samples | |
|---|---|---|
| | Control A | Control B |
| Precipitated silica | 85 | 0 |
| Pre-hydrophobated precipitated silica | 0 | 85 |
| Properties | | |
| Wet Traction Prediction, Rebound at 0° C. | | |
| Rebound (%), lower is better | 7.2 | 6.6 |
| Handling Prediction -- Stiffness (Modulus, Storage Modulus G', 11 Hertz, 100° C.) | | |
| G', 1% strain (MPa), higher is better | 2.3 | 1 |
| G', 10% strain (MPa), higher is better | 1.6 | 0.9 |
| Hysteresis prediction (higher rebound is better for lower hysteresis, better (reduced) tire predictive rolling resistance) | | |
| Rebound, 60° C., (%), higher is better | 54 | 62 |
| Rebound, 100° C., (%), higher is better | 66 | 73 |
| Tear resistance[1] (Newtons), higher is better | 76 | 60 |
| Grosch Abrasion Rate[2], mg/km abraded away (lower is better) medium severity abrasion test | 146 | 123 |

[1]Data obtained according to a tear strength (tear resistance) test to determine interfacial adhesion between two samples of a rubber composition. Such interfacial adhesion is determined by pulling one rubber composition away from the other at a right angle to the untorn test specimen with the two ends of the rubber compositions being pulled apart at a 180° angle to each other using an Instron instrument at 95° C. and reported as Newtons force.
[2]The Grosch abrasion rate run on an LAT-100 Abrader and is measured in terms of mg/km of rubber abraded away. The test rubber sample is placed at a slip angle under constant load (Newtons) as it traverses a given distance on a rotating abrasive disk (disk from HB Schleifmittel GmbH). In practice, a low abrasion severity test may be run, for example, at a load of 20 Newtons, 2° slip angle, disk speed of 40 km/hr for a distance of 7,500 meters; a medium abrasion severity test may be run, for example, at a load of 40 Newtons, 6° slip angle, disk speed of 20 km/hr and distance of 1,000 meters.

From Table 2 it is seen that for Control rubber Sample B, utilization of the pre-hydrophobated precipitated silica instead of the precipitated silica (and silica coupler) of Control rubber Sample A resulted in a significantly large beneficial increase in rebound property (beneficial reduction in hysteresis) for rubber Sample B.

From Table 2 it is also seen that for Control rubber Sample B utilization of the pre-hydrophobated precipitated silica instead of the precipitated silica (and silica coupler) of Control rubber Sample A resulted in an improved decrease (improvement) in abrasion resistance and predictive improved wet traction for rubber Sample B.

However, from Table 2 it is further seen that utilization of pre-hydrophobated precipitated silica in rubber Sample B resulted in a reduction of storage modulus G' (reduction in stiffness and associated predictive tire handling).

It is concluded that it would be desirable to evaluate whether the storage modulus G' property (100° C.) for the rubber composition containing the pre-treated precipitated silica as its reinforcing filler can be beneficially increased while substantially maintaining other beneficial physical properties for the rubber composition.

EXAMPLE II

In view of the results obtained in Example I, it is desired to evaluate promotion of a beneficial increase in the storage modulus G' of Control rubber Sample B in which the silica filler reinforcement used for its masterbatch was the pre-hydrophobated precipitated silica.

For such evaluation, it is proposed to blend limited amounts of the masterbatch of of rubber Sample A (containing the precipitated silica and silica coupler which has been reacted in situ within the rubber composition) to the masterbatch for rubber Sample B (containing the pre-hydrophobated silica reinforcement). Silica curatives are then added to the mixed rubber compositions in a separate and additional mixing step. In this manner it is envisioned that a complex network of the diene-based elastomer and precipitated silica reinforcement is created in the mixed rubber compositions.

In one respect, it is considered that the rubber compositions of the first and second masterbatches may substantially retain some of their respective physical property characterizations in the rubber masterbatch blends of the blended rubber compositions in a sense that it is expected that the silica coupling agent (of the masterbatch containing the separately added silica coupling agent) may react to preferentially attach the precipitated silica to the elastomers of the first masterbatch and the pre-hydrophobated precipitated silica may react to preferentially attach its precipitated silica to the elastomers of the second masterbatch.

In a further respect, in the blends of the masterbatches, it is envisioned that the remaining silica coupling agent, which may not have fully reacted with the precipitated silica and elastomers in the first masterbatch, may react with hydroxyl groups which may remain on the pre-hydrophobated precipitated silica of the second masterbatch to create a complex reinforcement network within the rubber composition of the blended masterbatches with the resultant rubber properties being unknown without experimentation.

For such evaluation, as indicated, it is desired to evaluate promoting an increase in the storage modulus G' of the pre-hydrophobated silica-containing rubber composition while substantially maintaining other beneficial physical properties.

For such evaluation, the following rubber compositions were prepared:

(A) Experimental rubber Sample C was prepared with a single masterbatch comprised of the elastomers with a 1/1 ratio of the precipitated silica to the pre-hydrophobated precipitated silica. A silica coupler was used for the precipitated silica. In this manner, the silica reinforcement was comprised of a complex network of the silica coupling agent reacting with the precipitated silica and elastomer as well as any remaining hydroxyl groups of the pre-hydrophobated precipitated silica and of the pre-hydrophobated silica with the elastomer.

(B) The fundamental evaluation of this invention was represented as Experimental rubber Sample D. Instead of forming a rubber blend in the manner of rubber Sample C containing both of the precipitated silica and pre-hydrophobated precipitated silica, a blend of separately prepared first and second masterbatches was created based on the formulation presented in Table 1 of Example I. The first masterbatch was provided with precipitated silica (together with its silica coupler) as a reinforcing filler. The second masterbatch was provided with pre-hydrophobated precipitated silica as a reinforcing filler. The ratio of pre-hydrophobated precipitated silica to precipitated silica was 1/1 for masterbatch blend. The pre-hydrophobated precipitated silica and pre-cipitated silica (with its silica coupler) were allowed to react separately with their respective rubber compositions before the masterbatches were mixed together.

By such methodology, the preparation of Experimental rubber Sample C by blending the elastomers with a combination of the precipitated silica (with its silica coupler) and pre-hydrophobated precipitated silica is avoided.

It is believed that such methodology involves evaluation of a novel procedure and resulting product.

(C) Experimental rubber Sample E was prepared in the manner of Experimental rubber Sample D except that additional precipitated silica was added to the to the blend of masterbatches (after the masterbatches are mixed together) and prior to the addition of sulfur curatives.

Various cured rubber properties of the rubber compositions prepared according to separate rubber composition preparations for rubber Control rubber Samples A and B and Experimental rubber Samples C, D and E are reported in the following Table 3.

For Table 3 the results for individual Control rubber Samples A and B are reported for Control rubber Samples A and B of Example I. Control rubber Sample B contained the pre-hydrophobated precipitated silica filler reinforcement. It is seen that Control rubber Sample B resulted in a significant beneficial increase in rebound property and an improvement in rate of abrasion yet with a reduction in stiffness property indicated by a reduction in storage modulus G'.

It was desired to evaluate obtaining the aforesaid beneficial increase in rebound property of rubber Sample B while improving the stiffness (G') property by providing rubber Sample C in which a blend of the pre-hydrophobated precipitated silica together with the precipitated silica (together with its silica coupling agent) in a 1/1 ratio was provided.

For Experimental rubber Sample C, it is seen that a beneficial rebound property was obtained and the stiffness property (G') was beneficially improved compared to Control rubber Sample B. However the abrasion rate was increased.

A significant aspect of this invention was the preparation of Experimental rubber Sample D as a variation of preparation of Experimental rubber Sample C. For Experimental rubber Sample D, individual and separate masterbatches were prepared in which a first masterbatch contained the precipitated silica and its silica coupling agent. A second masterbatch was prepared which contained the pre-hydrophobated precipitated silica. The first and second masterbatches were mixed following which, in a separate mixing step, the sulfur curatives were blended to form Experimental rubber Sample D.

It is seen from Table 2 that for Experimental rubber Sample D, as compared to Experimental rubber Sample C, that the beneficial rebound property was obtained by application of the masterbatch blending methodology with an improvement in low strain (one percent strain) stiffness (G') and an improved reduction in rate of abrasion (an improved abrasion resistance).

On this basis it is concluded that such individual masterbatch mixing methodology provided an improved rubber composition which is considered as being a significant discovery with the results being unpredictable without this experimentation.

TABLE 3

|  | Samples | | | | |
|---|---|---|---|---|---|
|  | Control | | Experimental | | |
|  | A | B | C | D | E |
| Precipitated silica | 85 | 0 | 43 | 43 | 43 |
| Pre-hydrophobated precipitated silica (CTS) | 0 | 85 | 43 | 43 | 43 |
| Properties | | | | | |
| Wet traction prediction, rebound at 0° C., (%) | 7.2 | 6.6 | 7.1 | 6.4 | 6.6 |
| Handling Prediction -- Stiffness (Modulus, Storage Modulus G', 11 Hertz, 100° C.), | | | | | |
| G', 1% strain (MPa) | 2.3 | 1.0 | 1.5 | 1.7 | 1.8 |
| G', 10% strain (MPa) | 1.6 | 0.9 | 1.4 | 1.4 | 1.4 |
| Hysteresis Prediction | | | | | |
| Rebound, 100° C., (%)(higher rebound is better, lower tan delta is better) | 66 | 73 | 72 | 73 | 73 |
| Tear resistance[1] (Newtons) | 76 | 60 | 60 | 54 | 58 |
| Grosch abrasion rate[2], mg/km abraded away medium severity abrasion test, (lower is better) | 146 | 123 | 137 | 122 | 125 |

For Experimental rubber Sample E, compared to Experimental rubber Sample D, an addition of precipitated silica was provided to the mixed masterbatches prior to the sulfur curative addition step. It is seen from Table 2 that such precipitated silica addition further improved the low strain stiffness (storage modulus G') of the rubber composition while maintaining the beneficial rebound property and abrasion resistance.

On this basis it is concluded that such mixing methodology and resulting rubber composition presented improvements in the nature of discoveries in both methodology and resulting product, with the results being unpredictable without this experimentation.

What is claimed is:

1. A method for preparation of a rubber composition comprised of at least two diene-based elastomers with precipitated silicas comprised of (1) a precipitated silica pre-treated with a silica coupling agent and (2) a precipitated silica together with a silica coupling agent, wherein said method is comprised of, based on parts by weight per 100 parts by weight rubber (phr):
   (A) preparation of a first masterbatch comprised of:
      (1) at least two conjugated diene-based elastomers, and
      (2) about 40 to about 200 phr of reinforcing filler comprised of rubber reinforcing carbon black and precipitated silica together with silica coupling agent for said precipitated silica having a moiety reactive with hydroxyl groups on said precipitated silica and another different moiety interactive with said conjugated diene-based elastomers,
   (B) preparation of a second masterbatch comprised of:
      (1) at least two conjugated diene-based elastomers, and
      (2) about 40 to about 200 phr of reinforcing filler comprised of rubber reinforcing carbon black and precipitated silica pre-treated with a silica coupling agent having a moiety reactive with hydroxyl groups on said precipitated silica and another different moiety interactive with said conjugated diene-based elastomers, (treated prior to its addition to the rubber composition),
   (C) blending said first and second masterbatches together to form a blended rubber composition,
      (1) together with sulfur curatives comprised of sulfur and at least one sulfur vulcanization accelerator, or
      (2) thereafter blending sulfur curatives with said blended rubber composition where the sulfur curatives are comprised of sulfur and at least one sulfur vulcanization accelerator.

2. The method of claim 1 wherein said conjugated diene-based elastomers are comprised of styrene/butadiene rubber and cis 1,4-polybutadiene rubber.

3. The method of claim 1 wherein said silica coupling agents for said precipitated silica and said pre-treated precipitated silica are comprised of at least one of alkoxyorganomercaptosilane and bis(3-triethoxysilylpropyl) polysulfide containing an average of from 2 to about 4 connecting sulfur atoms in its polysulfidic bridge.

4. The method of claim 1 wherein said silica coupling agent for said precipitated silica of said first masterbatch is comprised of said bis(3-triethoxysilylpropyl) polysulfide.

5. The method of claim 1 wherein said silica coupling agent for said pre-treated precipitated silica of said second masterbatch is an alkoxyorganomercaptosilane.

6. The method of claim 1 wherein weight ratio of said precipitated silica of said first masterbatch and said pre-treated precipitated silica of said second masterbatch is in a range of from about 4/1 to about 1/4.

7. The method of claim 2 wherein the weight ratio of said styrene/butadiene rubber to said cis 1,4-polybutadiene rubber in said first masterbatch is in a range of from about 10/1 to about 1/10 and in said second masterbatch is in a range of from about 10/1 to about 1/10, wherein the weight ratio of said styrene/butadiene rubber to said cis 1,4-polybutadiene rubber in said masterbatch blend is in a range of from about 10/1 to about 5/1.

8. The method of claim 1 wherein at least one of said first and second masterbatches further contains from about 5 to about 20 phr of at least one additional conjugated diene based elastomer comprised of at least one of polymers of at least one of isoprene and 1,3-butadiene and styrene with at least one of isoprene and 1,3-butadiene.

9. The method of claim 1 wherein at least one of said first and second masterbatches further contains from about 5 to about 20 phr of at least one additional conjugated diene based elastomer comprised of cis 1,4-polyisoprene rubber.

10. The method of claim 1 wherein each of said first and second masterbatches is individually mixed to a temperature in a range of from about 140° C. to about 170° C.

11. The method of claim 1 wherein said first and second masterbatches are mixed together with sulfur curative comprised of sulfur and at least one sulfur vulcanization accelerator.

12. The method of claim 2 wherein said first and second masterbatches are mixed together with said sulfur and vulcanization accelerators to a temperature in a range of from about 100° C. to about 130° C.

13. The method of claim 1 wherein said first and second masterbatches are mixed together to form a blended rubber composition following which sulfur and vulcanization accelerators are subsequently added to the blended rubber composition in a separate mixing step.

14. The method of claim 1 wherein said first and second masterbatches are mixed together to form a blended rubber composition to which additional precipitated silica is blended with said blended masterbatches following which said sulfur and sulfur vulcanization accelerator(s) are subsequently blended therewith in a separate mixing step.

15. The method of claim 14 wherein said added precipitated silica is reacted with residual silica coupling agent contained in the rubber composition without addition of coupling agent to the blended masterbatches.

16. A rubber composition comprised of a blend of said masterbatches of claim 1 wherein:
   (A) a first composite of rubber composition of said first masterbatch comprised of said at least two conjugated diene-based rubbers coupled to said precipitated silica with said silica coupler, where said silica coupler has a moiety reactive with hydroxyl groups on said precipitated silica and another different moiety interactive with said diene-based elastomer(s), and
   (B) a second composite of rubber composition of said second masterbatch comprised of said at least two conjugated diene-based rubbers coupled to said pre-hydrophobated precipitated silica comprised of precipitated silica pre-treated with silica coupler (coupling agent), where said silica coupler has a moiety reactive with hydroxyl groups on said precipitated silica and another different moiety interactive with said diene-based elastomer(s),
   wherein said rubber composition is comprised of said pre-treated (pre-hydrophobated) precipitated silica and said precipitated silica in a weight ratio thereof in a range of from about 4/1 to about 1/4.

17. A rubber composition comprised of the rubber composition of claim 16 as a blend thereof with sulfur curatives comprised of sulfur and at least one sulfur vulcanization accelerator.

18. A rubber composition is comprised of the rubber composition of claim 16 as a blend thereof with an additional precipitated silica.

19. A rubber composition prepared by the method of claim 1.

20. A tire having a component comprised of the rubber composition of claim 19.

21. A tire having a component comprised of the rubber composition of claim 16.

22. A tire having a tread comprised of the rubber composition of claim 16.

* * * * *